US010417134B2

(12) United States Patent
Faldu et al.

(10) Patent No.: US 10,417,134 B2
(45) Date of Patent: Sep. 17, 2019

(54) CACHE MEMORY ARCHITECTURE AND POLICIES FOR ACCELERATING GRAPH ALGORITHMS

(71) Applicant: Oracle International Corporation, Redwood City, CA (US)

(72) Inventors: Priyank Faldu, Edinburgh (GB); Jeffrey Diamond, Austin, TX (US); Avadh Patel, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 141 days.

(21) Appl. No.: 15/440,400

(22) Filed: Feb. 23, 2017

(65) Prior Publication Data

US 2018/0129613 A1 May 10, 2018

Related U.S. Application Data

(60) Provisional application No. 62/420,193, filed on Nov. 10, 2016.

(51) Int. Cl.
| | |
|---|---|
| *G06F 12/00* | (2006.01) |
| *G06F 13/00* | (2006.01) |
| *G06F 12/0875* | (2016.01) |
| *G06F 12/0891* | (2016.01) |
| *G06F 12/0897* | (2016.01) |
| *G06F 12/1027* | (2016.01) |
| *G06F 12/12* | (2016.01) |

(52) U.S. Cl.
CPC ...... *G06F 12/0875* (2013.01); *G06F 12/0891* (2013.01); *G06F 12/0897* (2013.01); *G06F 12/1027* (2013.01); *G06F 12/12* (2013.01); *G06F 2212/452* (2013.01); *G06F 2212/68* (2013.01); *Y02D 10/13* (2018.01)

(58) Field of Classification Search
CPC ............... G06F 12/123; G06F 12/0891; G06F 12/0897; G06F 12/1027; G06F 12/0875; G06F 2212/69; G06F 2212/452; G06F 2212/60; G06F 2212/68
USPC ........................................................ 711/136
See application file for complete search history.

(56) References Cited

U.S. PATENT DOCUMENTS

| | | | | |
|---|---|---|---|---|
| 5,675,773 A * | 10/1997 | Devic | ................. | G06F 12/0875 345/522 |
| 5,821,940 A * | 10/1998 | Morgan | ................. | G06T 17/00 345/420 |
| 6,421,058 B2 * | 7/2002 | Parikh | ................. | G06F 12/0875 345/522 |

(Continued)

*Primary Examiner* — Sheng Jen Tsai
(74) *Attorney, Agent, or Firm* — Meyertons, Hood, Kivlin, Kowert & Goetzel, P.C.

(57) ABSTRACT

A cache memory may be configured to store a plurality of lines, where each line includes data and metadata. A circuit may be configured to determine a respective number of edges associated with each vertex of a plurality of vertices included in a graph data structure, and sort the graph data structure using the respective number of edges. The circuit may be further configured to determine a reuse value for a particular vertex of the plurality of vertices using a respective address associated with the particular vertex in the sorted graph, and store data and metadata associated with the particular vertex in a particular line of the plurality of lines in the cache memory.

20 Claims, 12 Drawing Sheets

(56) References Cited

U.S. PATENT DOCUMENTS

| | | | |
|---|---|---|---|
| 6,426,747 B1* | 7/2002 | Hoppe | G06T 1/60 345/419 |
| 6,597,363 B1* | 7/2003 | Duluk, Jr. | G06T 15/005 345/506 |
| 6,690,380 B1* | 2/2004 | Hussain | G06F 12/0875 345/557 |
| 6,717,577 B1* | 4/2004 | Cheng | G06F 12/0875 345/419 |
| 7,038,692 B1* | 5/2006 | Priem | G06T 1/60 345/503 |
| 7,151,543 B1* | 12/2006 | Moreton | G06T 15/00 345/531 |
| 7,499,051 B1* | 3/2009 | O'Donnell | G06T 15/503 345/421 |
| 7,904,642 B1* | 3/2011 | Gupta | G06F 17/30982 711/108 |
| 8,316,060 B1* | 11/2012 | Snyder, II | G06F 17/30958 707/797 |
| 8,515,983 B1* | 8/2013 | Snyder, II | G06F 17/30985 707/760 |
| 8,760,460 B1* | 6/2014 | Kilgariff | G06T 1/60 345/543 |
| 8,819,078 B2 | 8/2014 | Roy | |
| 8,869,035 B2* | 10/2014 | Banerjee | H04L 41/12 715/733 |
| 9,514,245 B2 | 12/2016 | Venkataramani | |
| 9,692,705 B1* | 6/2017 | Zhou | H04L 45/54 |
| 2001/0024205 A1* | 9/2001 | Kishi | G06T 17/00 345/520 |
| 2003/0067468 A1* | 4/2003 | Duluk, Jr. | G06T 1/60 345/506 |
| 2003/0236949 A1* | 12/2003 | Henry | G06F 12/0862 711/137 |
| 2006/0143009 A1* | 6/2006 | Jost | G10L 15/285 704/254 |
| 2007/0052705 A1* | 3/2007 | Oliveira | G06F 17/509 345/423 |
| 2007/0260819 A1* | 11/2007 | Gao | G06F 12/0888 711/138 |
| 2008/0052378 A1* | 2/2008 | Matsuyama | H04L 41/22 709/218 |
| 2008/0052379 A1* | 2/2008 | Matsuyama | H04L 41/22 709/218 |
| 2008/0086465 A1* | 4/2008 | Fontenot | G06F 17/30731 |
| 2008/0094412 A1* | 4/2008 | Jiao | G06T 15/005 345/621 |
| 2008/0235456 A1* | 9/2008 | Kornegay | G06F 12/084 711/130 |
| 2008/0256300 A1* | 10/2008 | Lee | G06F 12/0875 711/125 |
| 2009/0119279 A1 | 5/2009 | Goyal | |
| 2010/0064107 A1* | 3/2010 | Eddy | G06F 12/0811 711/146 |
| 2011/0072214 A1* | 3/2011 | Li | G06F 12/0848 711/124 |
| 2011/0087968 A1* | 4/2011 | Lakshmanan | G06Q 10/10 715/751 |
| 2012/0206466 A1* | 8/2012 | Sharp | G06T 1/60 345/543 |
| 2013/0053545 A1* | 2/2013 | Young | G06F 19/12 530/350 |
| 2013/0227221 A1* | 8/2013 | Yu | G06F 12/0864 711/135 |
| 2013/0246818 A1* | 9/2013 | Nomura | G06F 1/3275 713/320 |
| 2014/0071128 A1* | 3/2014 | Everitt | G06T 15/005 345/426 |
| 2014/0136555 A1 | 5/2014 | Jacob | |
| 2014/0229496 A1* | 8/2014 | Minami | G06F 17/30958 707/756 |
| 2014/0237187 A1* | 8/2014 | Dimitrov | G06F 12/0897 711/122 |
| 2015/0067695 A1* | 3/2015 | Hamamoto | G06F 9/5016 718/104 |
| 2015/0207895 A1* | 7/2015 | Tulino | H04L 67/1097 370/235 |
| 2016/0034478 A1* | 2/2016 | Hernandez-Sherrington | G06F 17/30082 707/609 |
| 2016/0267018 A1* | 9/2016 | Shimizu | G06F 12/126 |
| 2016/0342445 A1* | 11/2016 | van der Lugt | G06F 17/30386 |
| 2017/0046614 A1* | 2/2017 | Golovashkin | G06N 3/082 |
| 2017/0060752 A1* | 3/2017 | Wei | G06F 12/08 |
| 2017/0169133 A1* | 6/2017 | Kim | G06F 17/30324 |
| 2017/0330304 A1* | 11/2017 | Baek | G06T 1/20 |
| 2018/0024989 A1* | 1/2018 | Bharti | G06F 17/2775 |
| 2018/0077251 A1* | 3/2018 | Shalita | H04L 67/22 |
| 2018/0089091 A1* | 3/2018 | Akenine-Moller | G06T 1/60 |

* cited by examiner

CACHE MEMORY ARCHITECTURE AND POLICIES FOR ACCELERATING GRAPH ALGORITHMS

PRIORITY INFORMATION

The present application claims benefit of priority to U.S. Provisional Patent Application No. 62/420,193 entitled "CACHE MEMORY ARCHITECTURE AND POLICIES FOR ACCELERATING GRAPH ALGORITHMS," filed Nov. 10, 2016.

BACKGROUND

Technical Field

Embodiments described herein relate to integrated circuits, and more particularly, to techniques for storing and accessing graph data in a cache memory.

Description of the Related Art

Computing systems typically include one or more processors or processor cores along with memories and other storage devices. The processors or processor cores may be configured to execute program instructions stored in a memory or other suitable storage location, such as, e.g., a hard drive, a CD-ROM, and the like. The memories and other storage devices may also be configured to store data, upon which a processor or processor core may operate.

During operation, a processor or processor core may retrieve a program instruction from memory, and then perform one or more operations associated with the retrieved program instruction. Some of the operations may include retrieving data from or storing data to a memory or other storage location. In some cases, the processor or processor core may retrieve data from memory, perform an operation on the data, such as, e.g., addition or subtraction, and then store a result of the operation in the memory.

To improve the performance of the computing system, frequently used instructions and data may be stored in a high-speed memory (commonly referred to as "cache memories" or "caches"). A computing system may include multiple cache memories, each of which is configured to store instructions or data with varying degrees of reuse. For example, a first level cache memory may be located within a processor or processing core and store program instructions or data with a high level of reuse. A second level cache may be positioned in a data path between a processor and system memory, and be configured to store program instructions or data that is not re-used as frequently as the program instructions or data stored in a first level cache memory.

SUMMARY OF THE EMBODIMENTS

Various embodiments of a cache memory system are disclosed. Broadly speaking, a circuit and a method are contemplated in which a cache memory is configured to store a plurality of lines, where each line includes data and metadata. A circuit may be configured to determine a respective number of edges associated with each vertex of a plurality of vertices included in a graph data structure and sort the graph data structure using the respective number of edges associated with each vertex to generate a sorted graph. The circuit may be further configured to determine a reuse value for a particular vertex of the plurality of vertices using a respective address associated with the particular vertex in the sorted graph, where the reuse value is indicative of a frequency with which a particular line of the plurality of lines associated with the particular vertex is accessed in the cache memory. The circuit may be further configured to store data and metadata associated with the particular vertex in the particular line of the plurality of lines, where the metadata includes at least the reuse value for the particular vertex.

In one embodiment, the circuit may be further configured to, in response to receiving new data to store in the cache memory, select a given line of the plurality of lines, and evict the given line.

In a further embodiment, the circuit may be further configured to select the given line of the plurality of lines in response to a determination that metadata associated with the given line does not include a reuse value.

BRIEF DESCRIPTION OF THE DRAWINGS

The following detailed description makes reference to the accompanying drawings, which are now briefly described.

Figure 1:
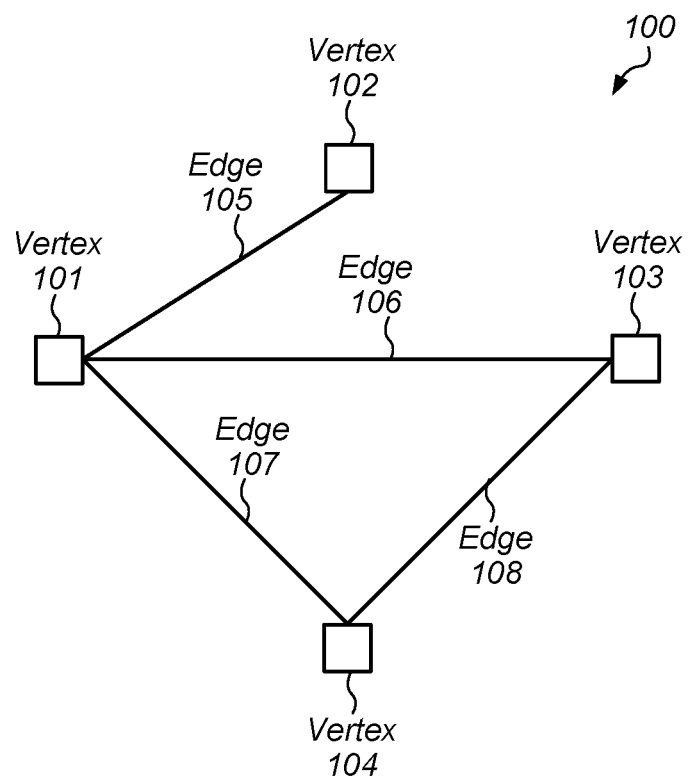
FIG. 1 illustrates an embodiment of a graph.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In computing systems, frequently accessed program instructions and data may be stored in high-speed memories commonly referred to as cache memories. Such cache memories typically have limited storage capacity in order to maintain performance, so data that is not being accessed frequently enough is evicted from a cache memory in favor of data with a higher reuse.

Certain data structures, however, present unique challenges to the use of cache memories. One such data structure is that of a graph. As used and described herein, a graph is an array of multiple vertices, wherein individual vertices are linked together via multiple edges. Graphs may be used in many applications, such as, e.g., determining a particular route in a map application.

When a graph data structure is accessed in memory, current cache policies treat all vertices of the graph equally, thereby allowing highly used vertices to be evicted in a similar fashion to infrequently used vertices. In many cases, however, some vertices have high reuse relative to other vertices in the graph. It would be desirable to have such high reuse vertices remain in a cache memory long enough for them to be accessed again, thereby saving a fetch from a higher-level cache memory or main memory. While a high reuse vertex is being retrieved from a higher-level cache memory or main memory, further processing of the graph data may be suspended, thereby extending the time to complete the graph-processing task.

In order to preserve high reuse vertices in the cache memory, they must first be identified. Once identified, cache eviction and replacement polices may be employed to limit eviction of high reuse vertices from the cache memory, thereby improving the hit rate for such vertices during the graph-processing task. The embodiments illustrated in the drawings and described below may provide techniques for identifying high reuse vertices included in graph data and increasing a duration such vertices are stored in a cache memory to reduce the time required to traverse a graph by reducing a number of cache misses as data related to the graph is accessed, while minimizing the impact on circuit complexity and area.

A block diagram depicting a graph is illustrated in FIG. 1. In the illustrated embodiment, graph 100 includes Vertices 101-104, and Edges 105-108. Each of Edges 105-108 couples a respective pair of vertices. In some embodiments, edges in a graph may include associated data specify a weight or cost associated with the particular edge. In such cases, a graph may be referred to as weighted graph.

Edge 105 couples vertex 101 to Vertex 102, and Edge 106 couples Vertex 101 to Vertex 103. Edge 107 further couples Vertex 101 to Vertex 104, which is, in turn coupled by Edge 108 to Vertex 103.

Each vertex included in a graph may be classified by a number of incoming edges. For example, in the illustrated embodiment, Vertex 101 has three incoming edges, while Vertex 102 has only a single incoming edge. When a graph is traversed, a vertex is accessed a number of times corresponding to the number of incoming edges the vertex has. As a result, it is possible to determine a metric of potential reuse of vertices in a graph data structure stored in a cache memory based upon the number of incoming edges for the various vertices. As described below in more detail, using the number of incoming edges may allow for high reuse portions of a graph data structure to remain in a cache memory, thereby reducing the overall time associated with traversing the graph.

Figure 2:
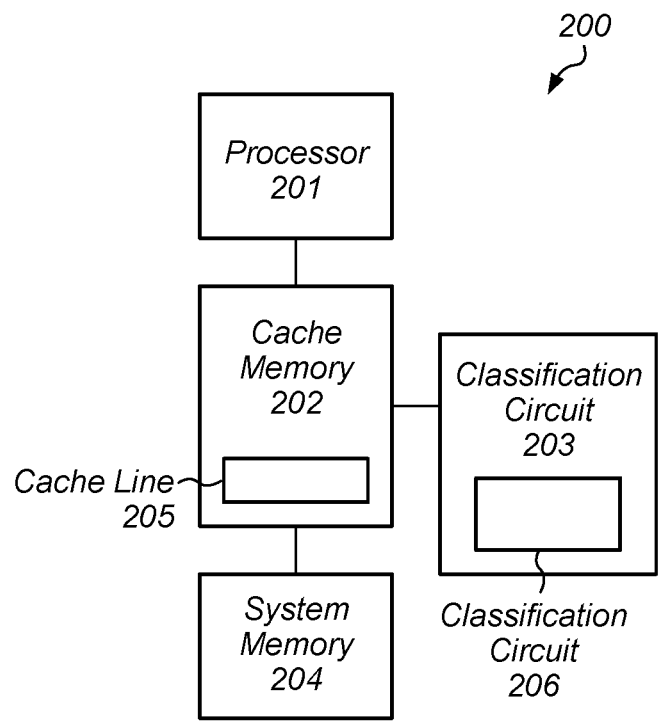
FIG. 2 illustrates an embodiment of a computing system.

An embodiment of a computing system is depicted in the block diagram of FIG. 2. In the illustrated embodiment, computing system 200 includes Processor 201, Cache Memory 202, Control Circuit 203, and System Memory 204.

As described below in more detail, Processor 201 may be any sort of general-purpose or dedicated processor configured to execute instructions and to process data according to a particular instruction set architecture (ISA). In one embodiment, cores Processor 201 may be configured to implement the SPARC® V9 ISA, although in other embodiments it is contemplated that any desired ISA may be employed, such as x86, PowerPC® or MIPS®, for example. In some embodiments Processor 201 may be configured to execute multiple execution threads (or simply "threads") concurrently, where a given thread may include a set of instructions that may execute independently of instructions from another thread.

Cache Memory 202 includes Cache Line 205, which may be configured to store frequently used data or program instructions so that Processor 201 may more quickly retrieve the data or program instructions as opposed to waiting for an access to System Memory 204. Although a single cache line is depicted, in other embodiments, any suitable number of cache lines may be employed. In some embodiments, the cache lines may be grouped together in one or more cache ways. Cache Memory 202 may be designed according to one of various design styles, such as, e.g., static random access memory (SRAM), or any other suitable design style.

Control Circuit 203 may include any suitable combination of logic circuits or sequential logic circuits configured to insert new data into the Cache Memory 202. If there is no available space in Cache Memory 202, Control Circuit 203 may select and then evict a previously stored cache line to allow for space new data to be stored. Data associated with an evicted cache line may be re-stored in System Memory 204. The selection and eviction may be performed in accordance with various algorithms, such as, selecting a least recently used entry for eviction, for example.

As described below in more detail, Classification Circuit 206, which is included in Control Circuit 203, may be configured to generate an indication or "hint" of how frequently a particular cache entry associated with a graph may be accessed. Control Circuit 203 may use such hints in the selection of a previously stored cache line for eviction. Classification Circuit 206 may include any suitable combination of logic circuits, sequential logic circuits, and storage circuits, such as, latches for flip-flops, for example.

System Memory 204 may be configured to store program instructions and/or data. In various embodiments, System Memory 204 may include Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or any other suitable type of memory.

Although only a single cache memory is depicted in the embodiment of FIG. 2, in other embodiments, different numbers of cache memories and different arrangements of cache memories may be employed.

Figure 3:
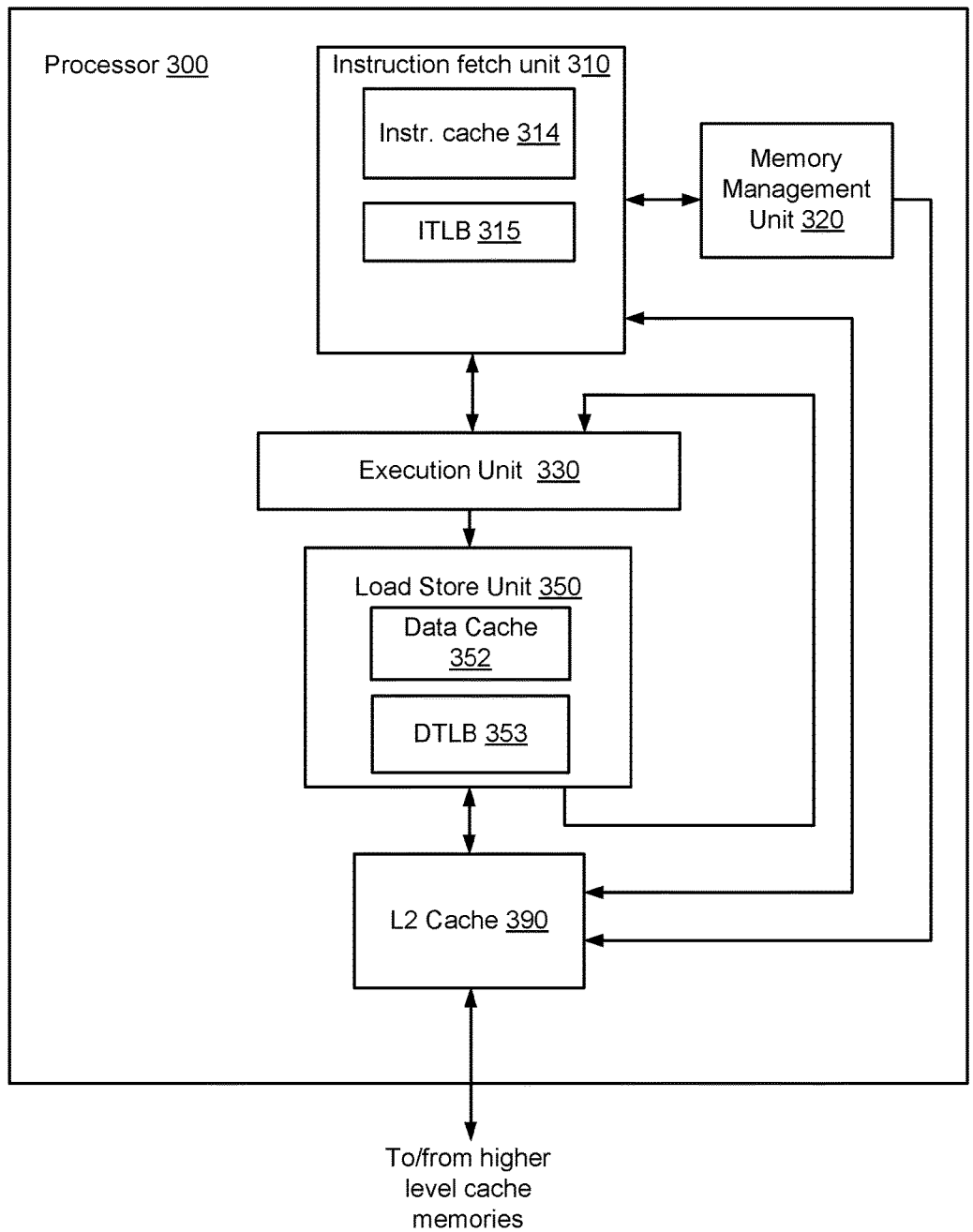
FIG. 3 illustrates an embodiment of a processor.

A possible embodiment of processor or processor core is illustrated in FIG. 3. In the illustrated embodiment, processor 300 includes various circuit blocks, such as an instruction fetch unit (IFU) 310 coupled to a memory management unit (MMU) 320, a L2 cache memory 390, and execution unit 330. Execution unit 230 is coupled to load store unit (LSU) 350, which is also coupled to send data back to each of execution unit 330. Additionally, LSU 350 may be configured to send data to or receive data from higher-level cache memories.

Instruction fetch unit 310 may be configured to provide instructions to the rest of processor 300 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314. In one embodiment, IFU 310 may include logic to maintain fetch addresses (e.g., derived from program counters) corresponding to each thread being executed by processor 300, and to coordinate the retrieval of instructions from instruction cache 314 according to those fetch addresses.

In some embodiments, IFU 310 may be configured to further prepare instructions for execution, for example by decoding instructions, detecting scheduling hazards, arbitrating for access to contended resources, or the like. Moreover, in some embodiments, instructions from a given thread may be speculatively issued from IFU 310 for execution. Additionally, in some embodiments IFU 310 may include a portion of a map of virtual instruction addresses to physical addresses. The portion of the map may be stored in Instruction Translation Lookaside Buffer (ITLB) 315.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, processor 300 may include more than one execution unit 330, and each of the execution units may or may not be symmetric in functionality.

Load store unit 350 may be configured to process data memory references, such as integer and floating-point load and store instructions. In some embodiments, LSU 350 may also be configured to assist in the processing of instruction cache 314 misses originating from IFU 310. LSU 350 may include a data cache 352 as well as logic configured to detect cache misses and to responsively request data from L2 cache 390 or a higher-level cache. Additionally, in some embodiments LSU 350 may include logic configured to translate virtual data addresses generated by execution unit 330 to physical addresses, such as Data Translation Lookaside Buffer (DTLB) 353.

It is noted that the embodiment of a processor illustrated in FIG. 3 is merely an example. In other embodiments, different circuit blocks or different configurations of circuit blocks are possible and contemplated.

As previously mentioned, a cache memory may store multiple lines of data. Each line of data may include, in addition to the desired data, metadata, which may be used during the selection of eviction candidates. An embodiment of a cache line is depicted in the block diagram of FIG. 4. In the illustrated embodiment, cache line 400 includes Data 401 and Metadata 404. In various embodiments, cache line 400 may correspond to cache line 205 of the embodiment depicted in FIG. 2.

Data 401 may include any suitable data to be stored in the cache memory. For example, Data 401 may include one or more program instructions to be executed by a processor. Alternatively, Data 401 may include one or more operands upon which a processor may perform arithmetic or logical operations. In some embodiments, Data 401 may include information indicative of a vertex of a graph, such as, a list of edges connected to the vertex.

Metadata 404 includes Reuse Bits 402 and Status Bits 403. In various embodiments, Reuse Bits 402 may include any suitable number of data bits configured to store information indicative of potential reuse in a cache of a particular vertex of a graph referenced in Data 401. A classification circuit, such as, Classification Circuit 206 may analyze the address information associated with Data 401 to determine a value for Reuse Bits 402. During the selection of a cache line for eviction from a cache memory, reuse bits, such as, e.g., Reuse Bits 402, may be reviewed.

Status Bits 403 may, in various embodiments, include any suitable number of data bits configured to store status information regarding Data 401. For example, Status Bits 403 may include information used to maintain coherence across multiple cache memories, each of which may have a copy of a particular cache line stored. Such information may be used to implement a coherence scheme, such as, e.g., the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid), or any other suitable coherence scheme.

Figure 4:
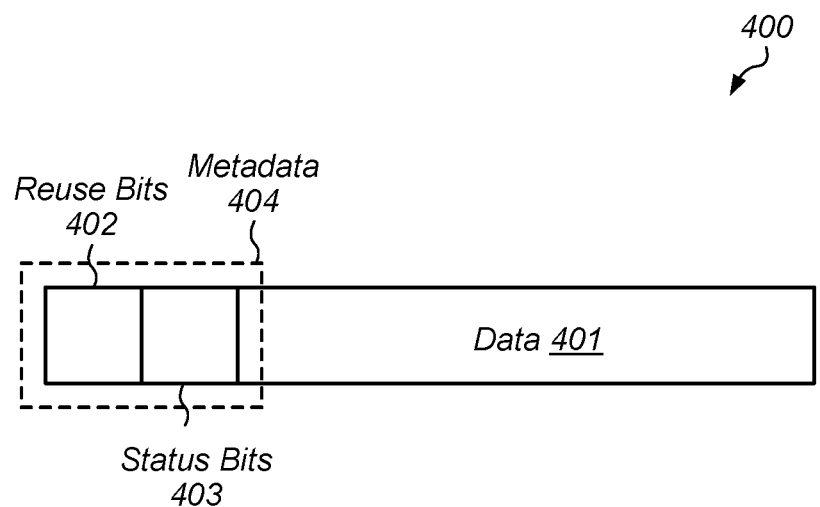
FIG. 4 illustrates an embodiment of a cache line.

Although two types of metadata are depicted in the embodiment of FIG. 4, in other embodiments, any suitable combination of types of metadata may be employed.

Figure 5:
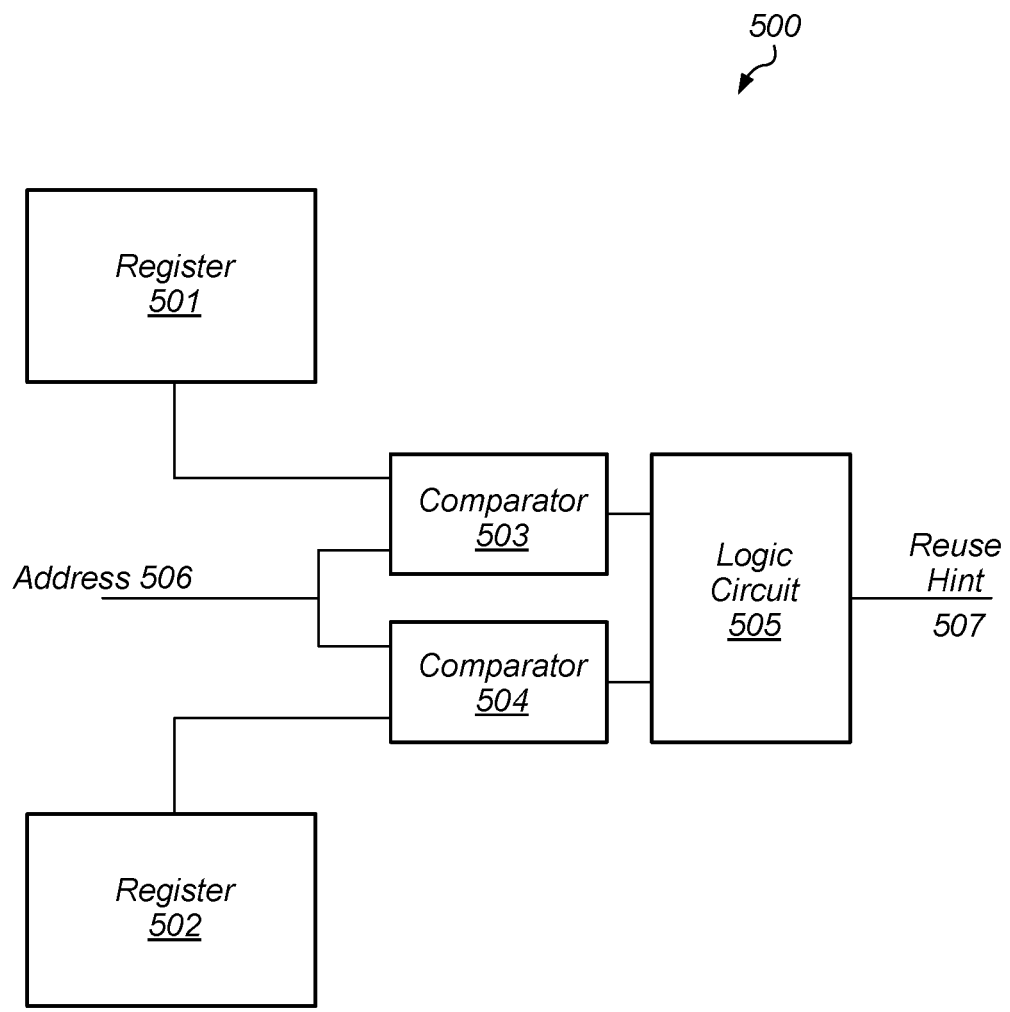
FIG. 5 illustrates an embodiment of a classification circuit.

Turning to FIG. 5, a block diagram of a classification circuit is illustrated. Classification Circuit 500 may, in various embodiments, correspond to Classification Circuit 206 of the embodiment illustrated in FIG. 2. In the illustrated embodiment, Classification Circuit 500 includes Register 501, Register 502, Comparator 503, Comparator 504, and Logic Circuit 505.

Registers 501 and 502 may include any suitable number of data storage circuits, such as, e.g., latches, configured to stored individual bits of an address. As described below in more detail, after an initial analysis of graph data stored in memory, two addresses, corresponding to addresses of cache lines with high reuse and low reuse, respectively, are identified and stored in Registers 501 and 502, respectively.

Comparator 503 is configured to compare the address stored in Register 501 and Address 506, which may correspond to an address of a cache line to be stored in a cache memory. In a similar fashion, Comparator 504 is configured to compare Address 506 to the address stored in Register 502. In some embodiments, if Address 506 is less than the address stored in Register 501, the cache line associated with Address 506 may have high potential reuse. Alternatively, if Address 506 is greater than the address value stored in Register 502, the cache line associated with Address 506 may have low potential reuse. If Address 506 does not fall into either of these ranges, the associated cache line may have moderate potential reuse.

Comparators 503 and 504 may be configured to compare either physical addresses or logical addresses dependent upon the cache memory with which Classification Circuit 500 is associated. Additionally, in some embodiments, Comparators 503 and 504 may compare a portion of the data bits includes in Address 506 with the address values stored in Registers 501 and 502, respectively. In various embodiments, each of Comparators 503 and 504 may include any suitable combination of logic circuits that are configured to compare data bits at corresponding bit positions within Address 506 and the address values stored in Register 501 and 502.

Since the addresses of entries of the graph have been previously sorted based on at least the number of incoming edge connections to each vertex of the graph, high reuse vertices may be located near each other spatially with the address space. Since the address values stored in Registers 501 and 502 are derived based on the addresses of the sorted graph, Classification Circuit 500 may generate Reuse Hint 507 independent of the incoming edge information, thereby reducing circuit complexity, as well as area and power consumption associated with Classification Circuit 500.

Logic Circuit 505 may include any suitable combination of logic circuit configured to receive results from Comparator 503 and 504 and generate Reuse Hint 507 using the received results. In some embodiments, Logic Circuit 505 may encode data bits used in Reuse Hint 507 to reduce a number of data bits to be stored. Reuse Hint 507 may be stored in a metadata portion of a cache line, such as, Metadata 404 as illustrated in FIG. 4, for example.

It is noted that the embodiment illustrated in FIG. 5 is merely an example. In other embodiments, different circuits, and different arrangements of circuits are possible and contemplated.

Depending on the type of address scheme, i.e., physical or virtual addressing, as well as other consideration, the classification circuit may be located in different places within the memory hierarchy of a computing system.

For computing systems that employ a virtual addressing scheme and smaller page sizes without consecutive page support, an ideal place to place the classification circuit, such as, e.g., classification circuit 500, is within the load store unit of individual processing cores. An embodiment of such a computing system is illustrated in FIG. 6.

In the illustrated embodiment, computing system 600 includes Cores 601A-601D coupled to L1 Caches 602A-602D, which are, in turn, coupled to L2 Caches 603A-603D. Each of L2 Caches 603A-603D are coupled to L3 Cache 604, and L3 Cache 604 is coupled to System Memory 605. Each or Cores 601A-601D may be any sort general-purpose processor as described above, and each of the L1 Cache 602A-602D, L2 Caches 603A-603D, and L3 Cache 604 may include any suitable type of memory, such as, SRAM, for example.

Each of Cores 601A-601D includes a respective one of Classification Circuit 607A-607D. In various embodiments, Classification Circuits 607A-607D may correspond to classification circuit 500 as illustrated in FIG. 5. In some cases, the classification circuits may be coupled to the LSU of the cores, so as soon as a virtual address is generated, it may be compared to boundary addresses stored in the registers of the classification circuit. Such a comparison may be performed for each graph-related load/store instruction.

Figure 6:
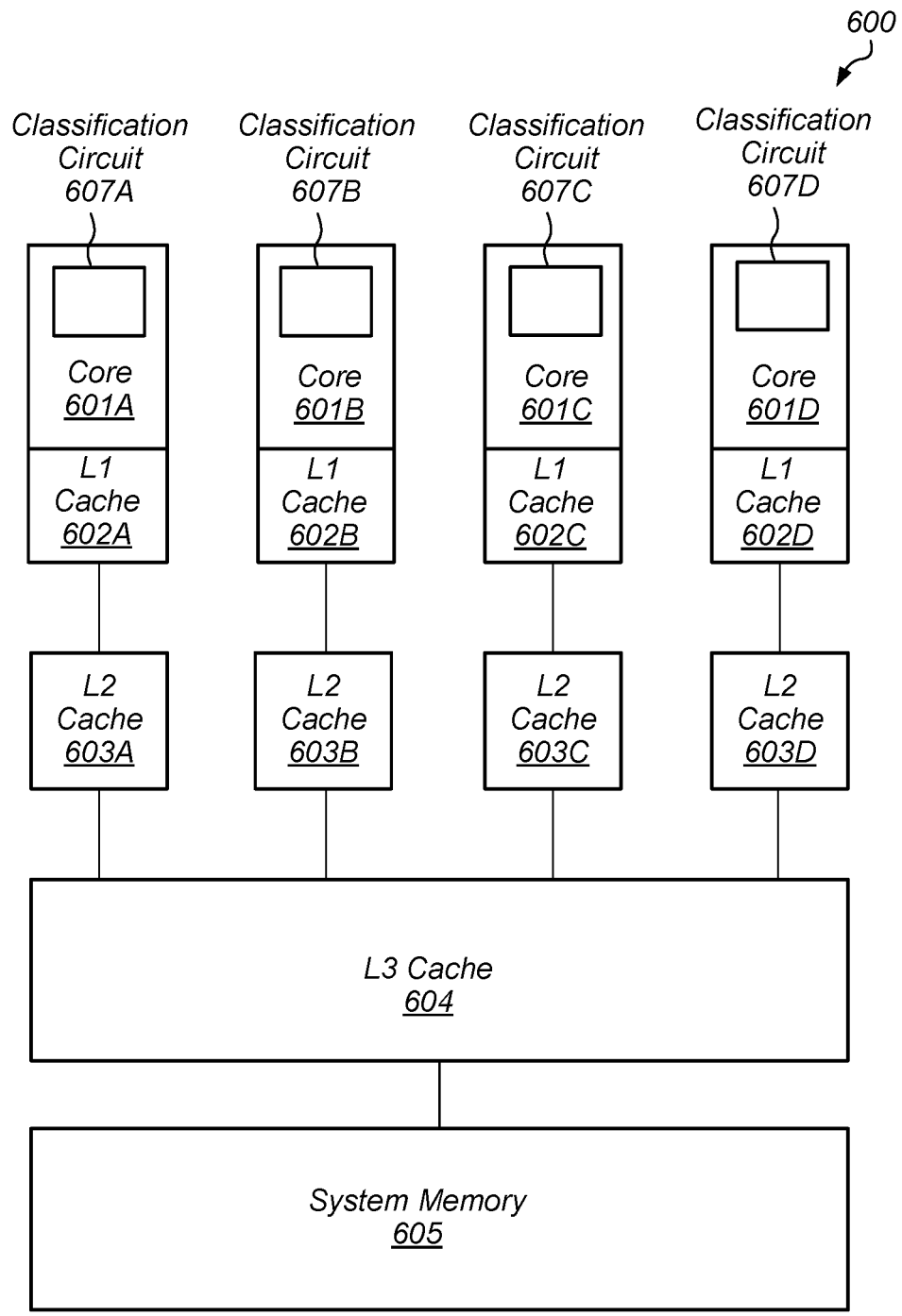
FIG. 6 illustrates an embodiment of a computing system with hierarchical cache memories.

Although only four processors and for L2 cache memories are depicted in the embodiment illustrated in FIG. 6, in other embodiments, any suitable number of processors and L2 cache memories may be employed.

For computing systems that employ physical addresses, large pages, or consecutive pages, the classification circuit may be loading into the controller of a last level cache (LLC). By placing the classification circuit into the LLC's controller, most of the microarchitecture changes are limited to the LLC's controller. Additionally, the specialized circuits are only activated in response to requests that already missed in the higher-level cache memories. Such an implementation may, in various embodiments, become unwieldy in cases where large pages or consecutive placement of physical pages is not supported.

Figure 7:
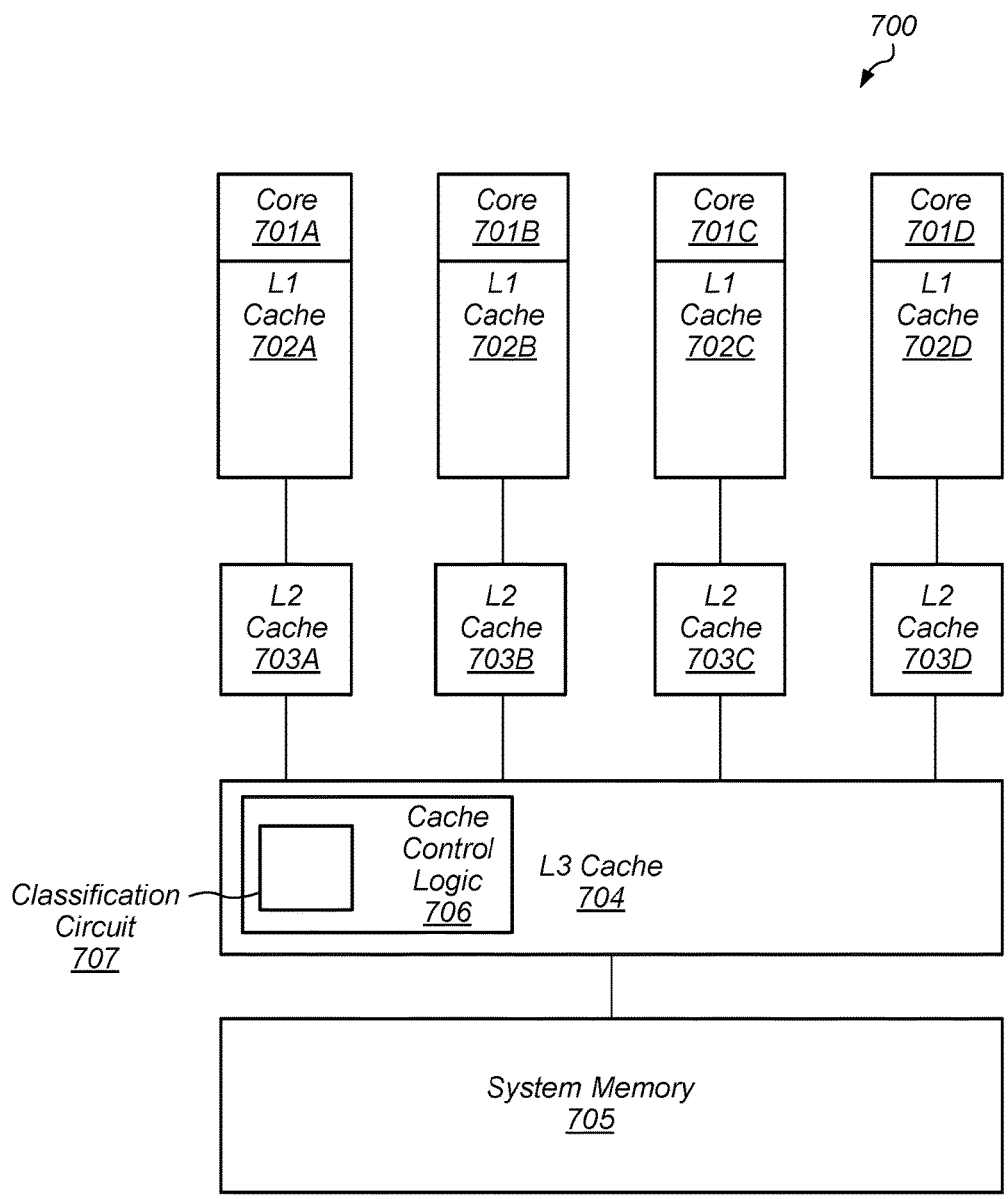
FIG. 7 illustrates another embodiment of a computing system with hierarchical cache memories.

An embodiment of such a system is illustrated in FIG. 7. In the illustrated embodiment, computing system 700 includes Cores 701A-701D coupled to L1 Caches 702A-702D, which are, in turn, coupled to L2 Caches 703A-703D. Each of L2 Caches 703A-703D are coupled to L3 Cache 704, and L3 Cache 704 is coupled to System Memory 605. In the embodiment of FIG. 7, L3 Cache 704 is a LLC. Each or Cores 701A-701D may be any sort general-purpose processor as described above, and each of the L1 Cache 702A-702D, L2 Caches 703A-703D, and L3 Cache 704 may include any suitable type of memory, such as, SRAM, for example.

Cache Control Logic 706 includes Classification Circuit 707. During operation, addresses, which have been pre-sorted, used in requests to L3 Cache 704 are checked against the boundary addresses stored in the registers of Classification Circuit 707 to determine an appropriate reuse classification.

It is noted that the embodiment illustrated in FIG. 7 is merely an example. In different embodiments, different numbers of processors and memories, and different arrangements of processors and memories are possible and contemplated.

Figure 8:
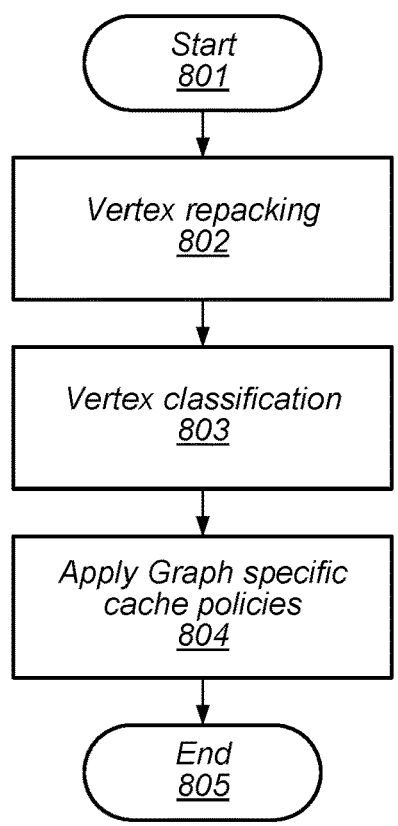
FIG. 8 illustrates a flow diagram depicting an embodiment of a method for operating a cache memory to accelerate graph algorithms.

Turning to FIG. 8, a flow diagram depicting an embodiment of a method for storing and accessing graph data in a cache memory is illustrated. Referring collectively to the embodiment of FIG. 2, and the flow diagram of FIG. 8, the method begins in block 801.

The vertices of the graph data may then be repacked (block 802). In response to executing program instructions stored in System Memory 204, Processor 201 may sort (also referred to herein as "repack") the vertices of a graph in descending order by a number of incoming edges (also referred to herein as a "edge count" or "edge degree" of vertex). It is noted that such a sorting process may be inexact as long as nearby vertices have similar edge counts, and that the descending order does not vary much in proportion to a maximum edge degree of the graph. The use of inexact or partial sorts, provided such a sort satisfies the above-referenced condition, may allow for less processing time to prepare the graph data to be used by Classification Circuit 206. By performing a sort in this fashion, it is possible, in certain embodiments, to preserve the original relative order of the vertices in the graph, and reduce a number of swap operations in the sort thereby reducing time and power to perform the sort.

The vertices of the graph data may then be classified (block 803). Classification Circuit 206 may then compare the repacked addresses of where data is stored for the vertices in the graph with selected values stored in the registers of the classification circuit. My using the repacked addresses, Classification Circuit 206 may be able to classify the vertices of the graph independently of detailed information regarding the graph, such as, e.g., the number of incoming edges for each vertex, thereby reducing the complexity of the circuit. It is noted that in some cases, a "check against bounds" instruction included in the ISA of Processor 201 may be executed in lieu of a dedicated circuit.

Once the vertices of the graph data have been repacked, and the vertices have been classified, graph specific cache policies may then be applied as the graph data is loaded into cache memory 202 (block 804). As described below in more detail, such cache policies may include the selection of lines for eviction based on the previously determined reuse hints.

It is noted that the embodiment depicted in the flow diagram of FIG. 8 is merely an example. In other embodiments, different operations and different orders of operations may be employed.

In order to more efficiently process graph data structures, such data structures may be sorted prior to use. An embodiment of method for performing such a sorting procedure is depicted in the flow diagram of FIG. 9. In various embodiments, the method depicted in the flow diagram of FIG. 9 may correspond to block 802 and block 803 of the method illustrated in the flow diagram of FIG. 8. Referring collectively to the embodiment of FIG. 2, and the flow diagram of FIG. 9, the method begins in block 901.

A graph data structure may then be received (block 902). In various embodiments, the graph data structure may include a plurality of vertices and a plurality of edges. A particular vertex of the plurality of vertices may be associated with one or more other vertices through respective edges of the plurality of edges. Such a data structure may be stored in System Memory 204, or any other suitable storage location.

Processor 201 or Control Circuit 203 may then determine number of incoming edges may then be determined for each vertex of the plurality of vertices (block 903). Using the determined number of incoming edges, Processor 201 or Control Circuit 203 may sort the plurality of vertices (block 904). Sorting the vertices in such a fashion may, in various embodiments, may allow for efficient classification of potential reuse of a particular vertex. Additionally, the sorting may improve spatial locality. Vertices with similar reuse potential will be stored near each other. This allows for cache lines to store data associated with multiple vertices that have similar reuse potential.

It is noted that the sorting procedure may be done offline as a one-time operation. The may be advantageous if the graph data structure is static. In cases when the graph data structure is dynamic, i.e., vertices and edges are continually being added to or subtracted from the graph, the sorting procedure may be performed on line, each time the dynamic graph data structure is to be traversed.

Processor 201 or Control Circuit 203 may then classify reuse hints for the graph data structure (block 905). Once the vertices are sorted, the resulting array of sorted vertices may be divided into the three ranges by choosing two addresses, Bh an Bc, from somewhere in the middle of the range of addresses of the data. The values may be selected statically, or may be determined dynamically during run time.

Assuming that B0 is the base address of the sorted array of vertices, and Bn is the address of the next to last element in the sorted array, then the relationship of Equation 1 holds.

$$B0 \leq Bh \leq Bc \leq B \quad (1)$$

In a typical graph traversal, a vertex is referenced as many times as the number of incoming edges to the vertex. Bh and Bc may be chosen based on a size of Cache Memory 202 and a distribution of the number of incoming edges to the vertices such that the addresses in the half-open interval [B0, Bh) fits in the last level cache and that a size of the half-open interval [Bc, Bn) is a large fraction of a size of the half-open interval [Bh, Bn). As a result of the above-referenced sorting procedure, it may be assumed that addresses included in the half-open interval [B0, Bh) has a high reuse potential, addresses included in the half-open interval [Bc, Bn) have little to no reuse potential, and addresses in the half-open interval [Bh, Bc) have moderate reuse potential.

In various embodiments, the values Bh and Bc may be loaded in the registers of Classification Circuit 206. Once the registers have been loaded with the determined address values, the method may conclude in bloc 906.

Figure 9:
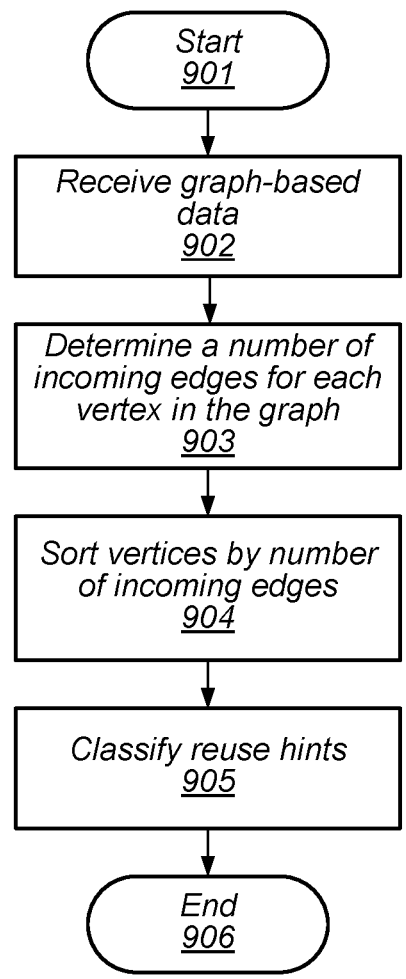
FIG. 9 illustrates a flow diagram depicting an embodiment of a method for repacking vertices of a graph.

It is noted that the embodiment of the method depicted in the flow diagram of FIG. 9 is merely an example. In other embodiments, different operations and different orders of operations may be employed.

When new data is to be stored in a cache memory, and there are no available lines in the cache memory, an existing line may be evicted. During the process of eviction, an existing cache line may be selected based on various metrics. If the contents of the selected line have been modified since the data was stored in the cache memory, the updated contents may be written back to a next higher cache memory or system memory. The selected line may then be made available to store the new data.

As mentioned above, when traversing graph data structures, it is desirable to keep data relating to high reuse potential vertices in the cache memory in order to minimize cache misses and improve performance. An embodiment of a method for selecting a cache line for eviction when the cache memory includes data from graph data structure is depicted in the flow diagram of FIG. 10. Referring collectively to FIG. 2, and the flow diagram of FIG. 10, the method begins in block 1001.

All of the lines current stored in the Cache Memory 202 are checked to determine if lines with no reuse potential are stored (block 1002). As previously described, cache lines may include metadata, which, in some embodiments, may include data indicative of a potential reuse. The method may then depend on if any cache lines with no reuse potential are available (block 1003).

If there is a line with no reuse potential, then the line may be selected for eviction (block 1010). The selected line may then be evicted. During the eviction process, the selected line be evaluated by checking status information associated with the selected line to determine if the current contents on the selected line need to be re-written back to a higher level cache memory or to system memory. The method may then conclude in block 1009.

Alternatively, if there are no lines available that have no reuse potential, then the each of the cache lines in Cache Memory 202 are checked for lines that no reuse hint information available (block 1004). As before, the check may be accomplished by Control Circuit 203 or Processor 201 checking the metadata associated with the lines stored in Cache Memory 202. The method may then depend on if there are lines available that do not have any associated reuse hint information available (block 1005).

If there are lines stored in Cache Memory 202 that do not have associated reuse hint information, a particular one of the no hint available lines may then be selected (block 1011). In various embodiments, the selection of the particular one of the available no hint lines may be performed according to one of various selection methods, such as, least recently used (LRU), for example. The selected no hint line may then be evicted and the method may then conclude in block 1009.

Alternatively, if there are no "no hint" lines stored in Cache Memory 202, either Control Circuit 203 or Processor 201 may check metadata associated with the stored lines searching for lines that have moderate reuse potential (block 1006). The method may then depend on if there are lines with moderate reuse potential stored in Cache Memory 202 (block 1007).

If moderate reuse potential lines are present in Cache Memory 202, a particular one of the moderate reuse potential lines may be selected and evicted (block 1012). In various embodiments, any suitable algorithm, such as, e.g., LRU, may be used to select the particular one of multiple moderate reuse potential lines. The method may then conclude in block 1009.

If there are no lines with moderate reuse potential currently stored in Cache Memory 202, then a particular line of lines with high reuse potential is selected and evicted (block 1008). When multiple lines with high reuse potential are stored in Cache Memory 202, any suitable algorithm, such as, e.g., LRU may be used to select the particular line. The method may then conclude in block 1009.

Figure 10:
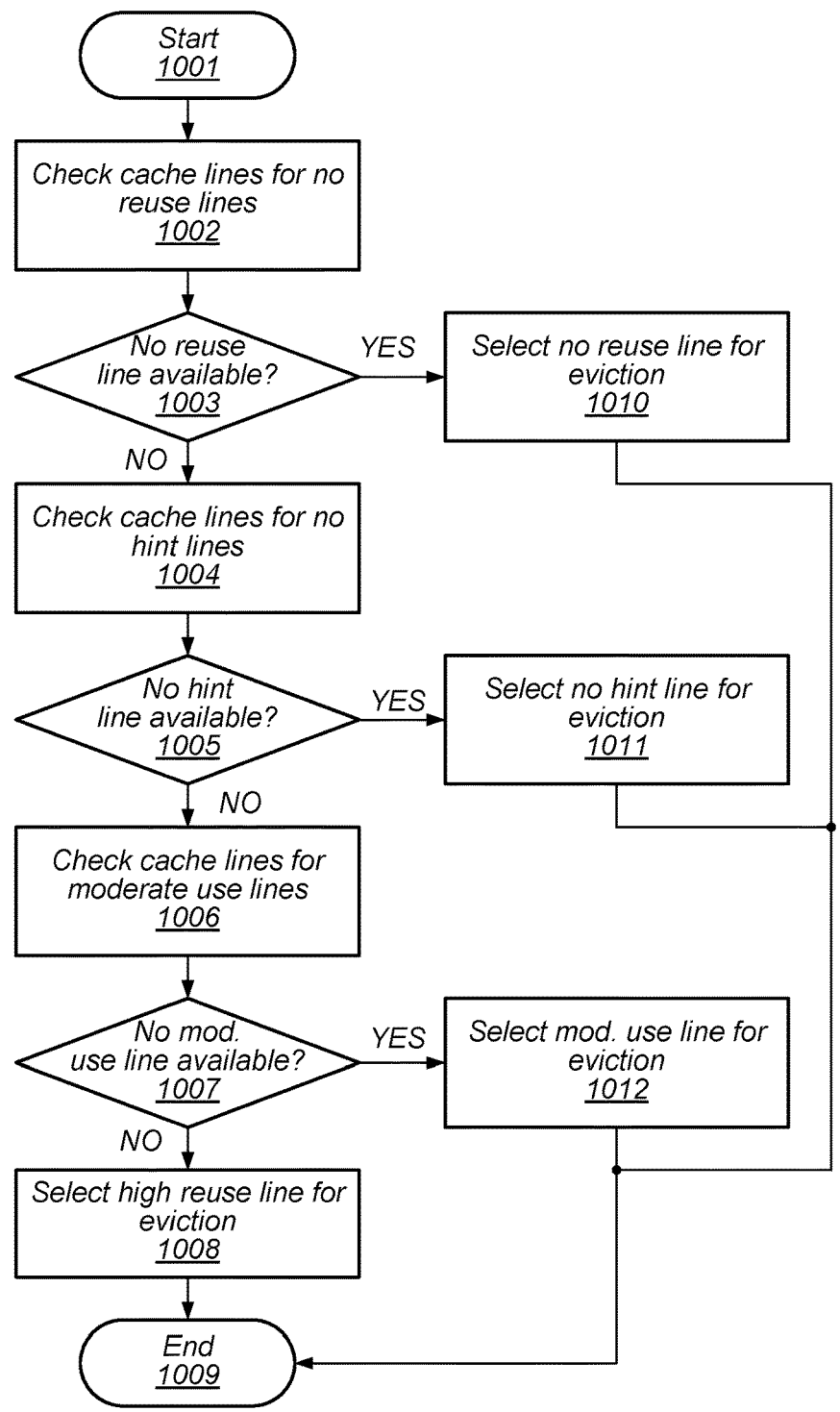
FIG. 10 illustrates a flow diagram depicting an embodiment of a method for evicting lines from a cache memory storing graph data.

It is noted that the embodiment of the method depicted in the flow diagram of FIG. 10 is merely an example. In other embodiments, different operations and different orders of operations may be employed.

In order to maintain the graph-related data in the cache memory, the eviction priorities for a new cache line may be set use any reuse hint information available. An embodiment of method for setting the eviction priorities is depicted in the flow diagram of FIG. 11. Referring collectively to the embodiment of FIG. 2, and the flow diagram of FIG. 11, the method begins in block 1101.

New data to be stored in a cache line of Cache Memory 202 may then be received (block 1102). The new data may be associated with a graph data structure, or it may be unrelated, and may be received in response to a cache miss resulting from a data request by Processor 201. The method may then depend on if a reuse hint is available for the new data (block 1103).

If there is not reuse hint information available, it is assumed that the new data is not part of the graph data structure, and a traditional cache insertion policy is applied (block 1108). Once the traditional insertion policy has been applied to the new data, the method may conclude in block 1107.

Alternatively, if reuse hint information is available for the new data, then the method may depend on whether the reuse hint information indicates a low reuse potential for the new data (block 1104). If a low reuse potential is indicated, then cache insertion may be bypassed or a high eviction priority may be set (block 1109). Bypassing cache insertion or setting the eviction priority to a high level may make space made available for graph-related data that has a higher potential reuse. If cache insertion is bypassed, the method may conclude in block 1107.

If, however, the reuse hint information indicates something other than a low reuse potential, Control Circuit 203 may set the eviction priority to a level based on a value of the reuse hint (block 1105). In various embodiments, to set the eviction priority, Control Circuit 203 may modify one or more data bits included in metadata associated with a cache line in which the new data is stored. In some cases, Processor 201 may make the desired modifications to the one or more data bits included in the metadata.

Once the eviction priority has been set, a new cache line may be inserted into Cache Memory 202 to store the new data (block 1106). With the storage of the new data complete, the method may conclude in block 1107.

Figure 11:
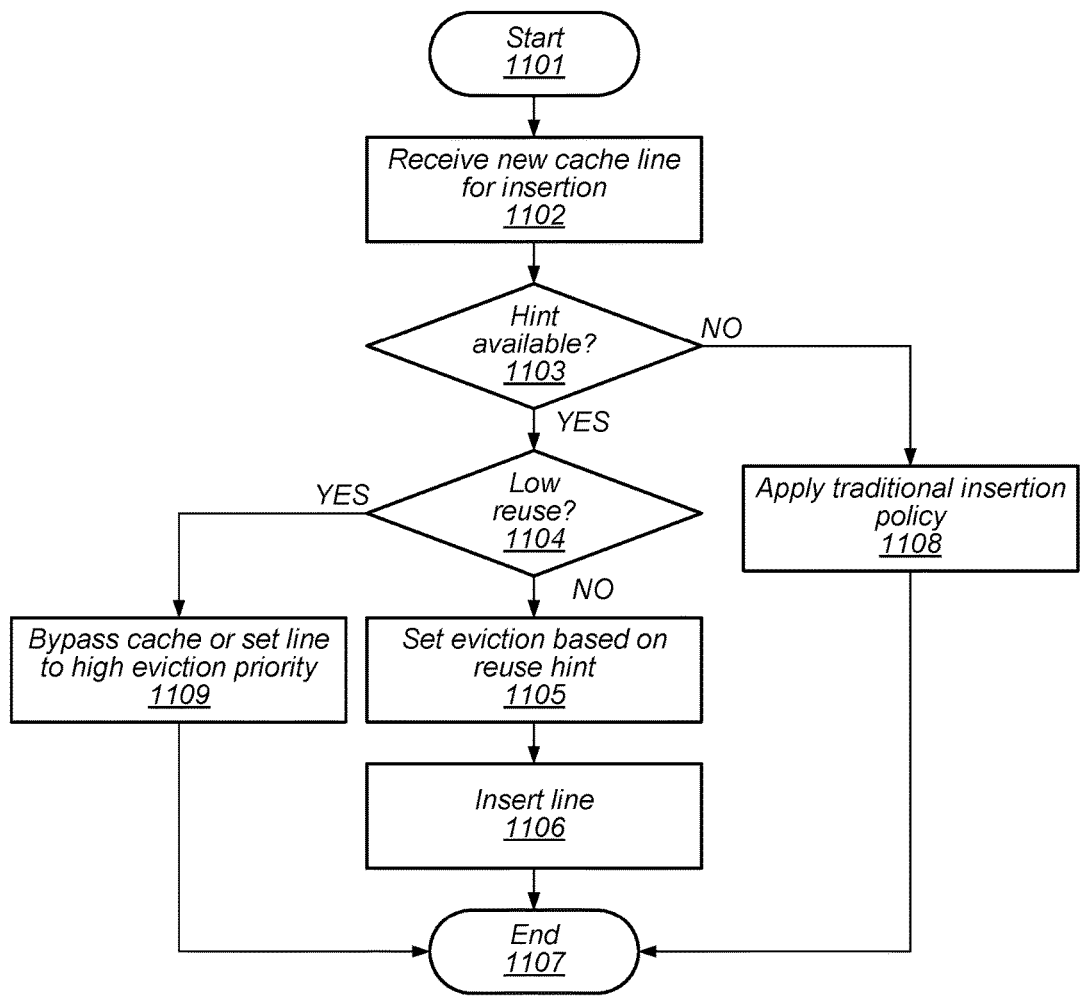
FIG. 11 illustrates a flow diagram depicting an embodiment of a method for inserting graph data into a cache memory.

Although the operations include in the method of FIG. 11 are depicted as being performed in a sequential fashion, in other embodiments, one or more of the operations may be performed in parallel.

Figure 12:
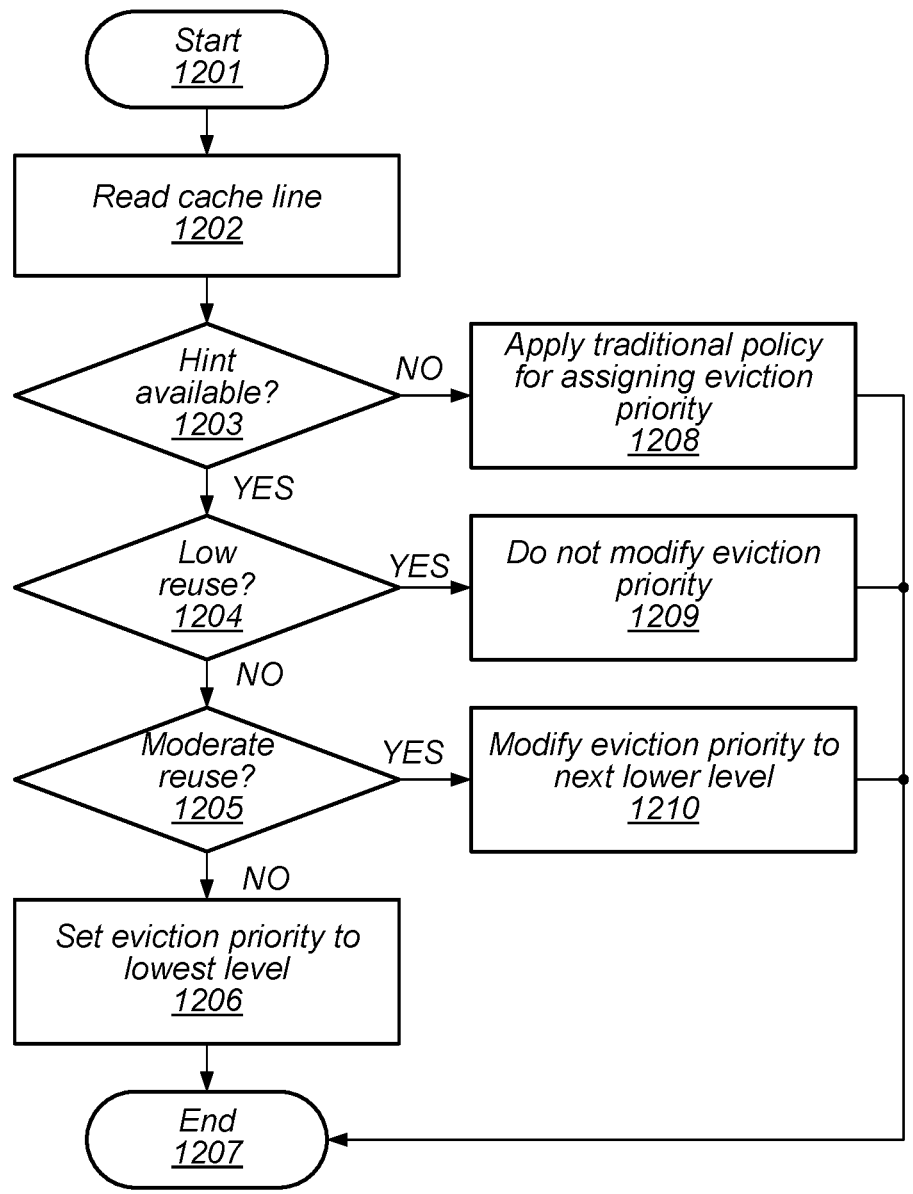
FIG. 12 illustrates a flow diagram depicting an embodiment of a method for modifying the eviction priority of a line in a cache memory storing graph data.

Turning to FIG. 12, a flow diagram depicting an embodiment of a method for modifying an eviction priority of cache lines. Referring collectively to the embodiment of FIG. 2, and the flow diagram of FIG. 12, the method begins in block 1201.

A cache line Cache Memory 202 may then be read (block 1202). The results of the read may be sent to Processor 201 and may be in response to performing a traversal of a graph data structure stored in System Memory 204. The method may then depend on if reuse hint information is available for the cache line (block 1203).

If no reuse hint information is available, then a traditional policy for assigning eviction priority may be applied by Control Circuit 203 (block 1208). Once the traditional policy has been applied, the method may conclude in block 1207.

If, however, a reuse hint is available in the metadata stored along with the cache line, then the method may depend on if the reuse hint indicates that the cache line has a low reuse potential (block 1204). By examining the metadata associated with the cache line, Control Circuit 203 can ascertain if the reuse potential for the cache line is low. If the reuse potential is low, then Control Circuit 203 leaves the eviction priority unchanged (block 1209). The method may then conclude in block 1207.

When the reuse hint associated with the cache line indicates a reuse potential other than a low reuse potential, then the method may depend on if the reuse potential is moderate (block 1205). If the reuse potential is moderate, Control Circuit 203 modifies the eviction priority of the cache line, setting it to a next lower level (block 1210). In some embodiments, Control Circuit 203 may modify one or more data bits included in the metadata associated with the cache line. By setting the eviction priority to the next lower level, the likelihood of the cache line being evicted during future cache line insertion operations is reduced, thereby improving access time for future graph-related operations. Once Control Circuit 203 has completed modifying the eviction priority, the method may conclude block 1207.

If the reuse hint indicates that the cache line has neither low nor moderate reuse potential, it is assumed that the cache line has a high reuse potential, and Control Circuit 203 may set the eviction priority of the cache line to the lowest level (block 1206). As described above, Control Circuit 203 may modify one or more data bits in the metadata associated with the cache line. By setting the eviction priority to the lowest level, a cache line with high potential reuse is unlikely to be evicted from Cache Memory 202. Once Control Circuit 203 has modified the eviction priority of the cache line, the method may conclude in block 1207.

It is noted that the embodiment of the method depicted in the flow diagram of FIG. 12 is merely an example. In other embodiments, different operations or different orders of operations may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims

What is claimed is:

1. An apparatus, comprising:
a cache memory configured to store a plurality of lines that include data and metadata; and
a circuit configured to:

determine a respective number of edges associated with vertices of a plurality of vertices included in a graph data structure;

sort the graph data structure using the respective number of edges associated with the vertices of the plurality of vertices to generate a sorted graph;

determine a reuse value for a particular vertex of the plurality of vertices using results of a comparison of a respective address associated with the particular vertex in the sorted graph to a plurality of address ranges associated with corresponding addresses of the plurality of vertices, wherein the reuse value is indicative of a frequency with which a particular line of the plurality of lines associated with the particular vertex is accessed in the cache memory; and store, in the cache memory, data and metadata associated with the particular vertex of the plurality of vertices in the particular line, wherein the metadata includes at least the reuse value for the particular vertex and a list of edges connected to the particular vertex.

2. The apparatus of claim 1, wherein the circuit is further configured to:

in response to receiving new data to store in the cache memory, select a given line of the plurality of lines; and evict the given line.

3. The apparatus of claim 2, wherein the circuit is further configured to select the given line of the plurality of lines in response to a determination that metadata associated with the given line does not include a corresponding reuse value.

4. The apparatus of claim 2, wherein the circuit is further configured to select the given line in response to a determination that the given line is associated with a given vertex of the plurality of vertices and that a corresponding reuse value for the given vertex indicates low reuse potential.

5. The apparatus of claim 2, wherein the circuit is further configured to select the given line in response to a determination that the given line is associated with a given vertex of the plurality of vertices and that a corresponding reuse value for the given vertex indicates a medium reuse potential and that a particular line of the plurality of lines associated with a particular vertex of the plurality of vertices that has a low reuse is not currently stored in the cache memory.

6. The apparatus of claim 1, wherein to determine the reuse value for the particular vertex of the plurality of vertices, the circuit is further configured to compare an address value associated with a location in the cache memory associated with the particular vertex to at least one previously determined address values.

7. A method, comprising:

identifying a respective number of edges connected to vertices of a plurality of vertices included in a graph data structure stored in memory of a computing system;

sorting the graph data structure using the respective number of edges connected to the vertices included in the graph data structure to generate a sorted graph;

determining a reuse value for a particular vertex of the plurality of vertices using results of comparing a respective address associated with the particular vertex in the sorted graph to a plurality of address ranges associated with corresponding addresses of the plurality of vertices, wherein the reuse value is indicative of a frequency with which a particular line of a plurality of lines stored in a cache memory associated with the particular vertex is accessed; and storing, in the cache memory, data and metadata associated with the particular vertex of the plurality of vertices in the particular line, wherein the metadata includes at least the reuse value for the particular vertex and a list of edges connected to the particular vertex.

8. The method of claim 7, further comprising:

in response to receiving new data to store in the cache memory, selecting a given line of the plurality of lines; and evicting the given line.

9. The method of claim 8, further comprising selecting the given line of the plurality of lines in response to determining that metadata associated with the given line does not include a corresponding reuse value.

10. The method of claim 8, further comprising selecting the given line in response to determining that the given line is associated with a given vertex of the plurality of vertices and that a corresponding reuse value for the given vertex indicates low reuse potential.

11. The method of claim 8, further comprising selecting the given line in response to determining that the given line is associated with a given vertex of the plurality of vertices and that a corresponding reuse value for the given vertex indicates a medium reuse potential and that a particular line of the plurality of lines associated with a particular vertex of the plurality of vertices that has a low reuse is not currently stored in the cache memory.

12. The method of claim 8, further comprising selecting the given line in response to determining that the given line is associated with a given vertex of the plurality of vertices and that a corresponding reuse value for the given vertex indicates a high reuse potential and that a particular line of the plurality of lines associated with a particular vertex of the plurality of vertices that has either a low reuse potential or medium reuse potential is not currently stored in the cache memory.

13. The method of claim 7, wherein determining the reuse value for the particular vertex of the plurality of vertices includes comparing an address value associated with a location in the cache memory associated with the particular vertex to at least one previously determined address values.

14. The method of claim 7, further comprising:

receiving new data to be stored in the cache memory; and bypassing insertion in the cache memory in response to determining that a given vertex of the plurality of vertices associated with the new data has a low reuse potential.

15. A system, comprising:

a memory configured to store a graph data structure that includes a plurality of vertices, and a plurality of edges, wherein each specifies a connection between two vertices of the plurality of vertices;

a cache memory configured to store a plurality of lines, wherein each line of the plurality of lines includes data and metadata; and a processor configured to:

determine a respective number of edges associated with vertices of the plurality of vertices;

sort the graph data structure using the respective number of edges associated with the vertices of the plurality of vertices to generate a sorted graph;

determine a reuse value for a particular vertex of the plurality of vertices using results of a comparison of a respective address associated with the particular vertex in the sorted graph to a plurality of address ranges associated with corresponding addresses of the plurality of vertices, wherein the reuse value is indicative of a frequency with which a particular line of the plurality of lines associated with the particular vertex is access in the cache memory; and store, in the cache memory, data and metadata associated with the particular vertex of the plurality of vertices in the particular line of the plurality of lines, wherein the metadata includes at least the reuse value for the particular vertex and a list of edges connected to the particular vertex.

16. The system of claim 15, wherein the processor is further configured to:

in response to receiving new data to store in the cache memory, select a given line of the plurality of lines; and evict the given line.

17. The system of claim 16, wherein the processor is further configured to select the given line of the plurality of lines in response to a determination that metadata associated with the given line does not include a corresponding reuse value.

18. The system of claim 16, wherein the processor is further configured to select the given line in response to a determination that the given line is associated with a given vertex of the plurality of vertices and that a corresponding reuse value for the given vertex indicates a low reuse potential.

19. The system of claim 16, wherein the processor is further configured to select the given line in response to a determination that the given line is associated with a given vertex of the plurality of vertices and that a corresponding reuse value for the given vertex indicates a medium reuse and that a particular line of the plurality of lines associated with a particular vertex of the plurality of vertices that has a low reuse is not currently stored in the cache memory.

20. The system of claim 19, wherein to determine the reuse value for the particular vertex of the plurality of vertices, the processor is further configured to compare an address value associated with a location in the memory associated with the particular vertex to at least one previously determined address values.

* * * * *